Figures 1, 2:
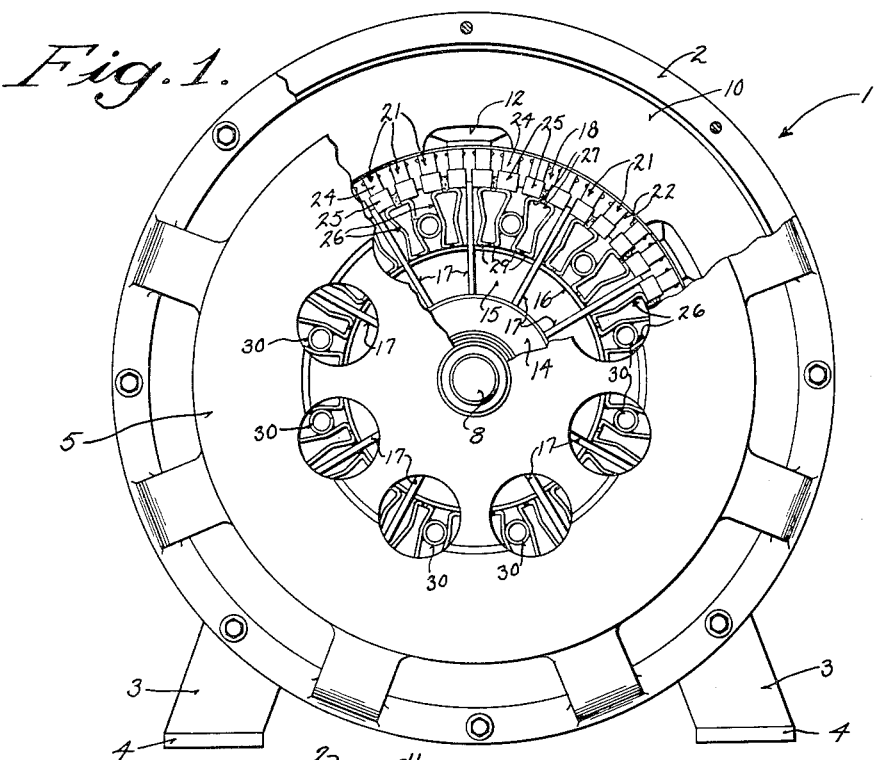

INVENTORS
Henry S. Jacobs
Theodore H. Fast
BY Arthur H. Seidel
ATTORNEY

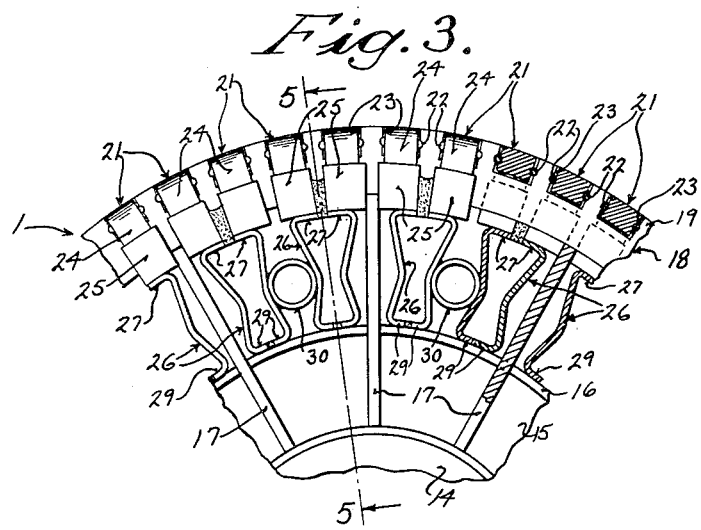
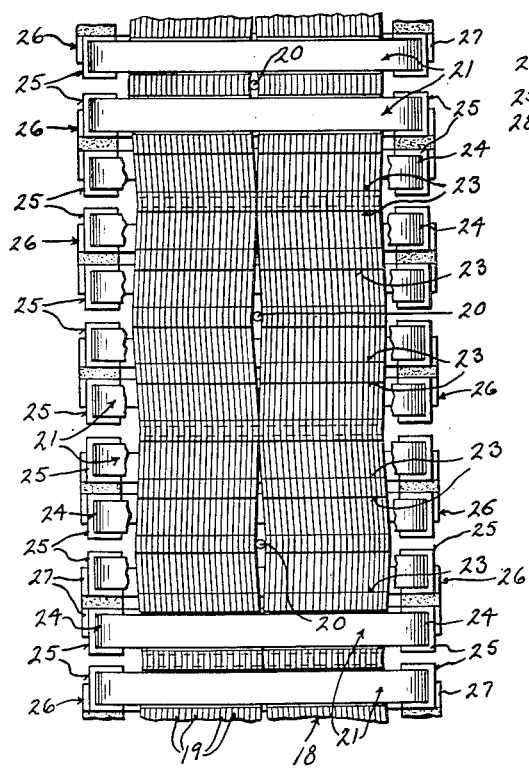
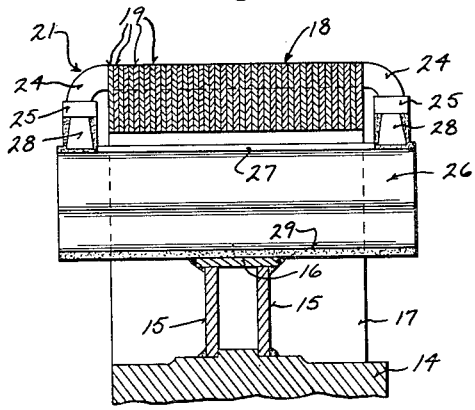

United States Patent Office 2,773,204
Patented Dec. 4, 1956

2,773,204

ELECTRO-MAGNETIC APPARATUS FOR TORQUE TRANSMISSION

Henry S. Jacobs, Shorewood, and Theodore M. Fast, West Allis, Wis., assignors to Harnischfeger Corporation, Milwaukee, Wis., a corporation of Wisconsin Application December 29, 1953, Serial No. 400,941

10 Claims. (Cl. 310—93)

This invention relates to induced current torque transmitting apparatus suitable as a brake or a clutch, and it more specifically resides in an apparatus having relatively rotatable field and induced current members with a plurality of axially extending inductor bars, mounted circumferentially of the rim of magnetic material forming a part of the induced current member, the bars being disposed to traverse flux threading the field member and rim upon relative rotation between the members with resulting induction of currents therein which gives rise to working torque, the bars being electrically associated with a plurality of current conducting fins disposed beside the rim of magnetic material each fin extending axially and being joined to the ends of a rotor bar on the opposite sides of the magnetic rim to complete a plurality of circumferentially spaced conducting circuits encircling the rim of the induced current member.

Working torque in an induced current torque transmitter is dependent upon the generation of induced current, and the heat loss from such current and the attendant temperature rise in the induced current member have been limiting factors in the output. When the generation of heat takes place principally in the magnetic flux conducting portions of the induced current member thermal stresses may become disruptive. Also, thermal expansion causing variation in the air gap width may sharply limit permissible torque output and cause unwanted variations in output between intermittent and constant duty conditions. In an effort to overcome this disadvantage one form of apparatus has been proposed which provides an induced current member conducting circuit comprising a squirrel cage with low resistance bars embedded in a magnetic drum with cooling fins of substantial electrical resistance forming parts of the end ring connections, disposed on the sides of the magnetic drum. Heat is then evolved largely within the fins which are free to expand thermally and from which the heat may be more readily dissipated. With a rapid rate of change in rotor speed such as may be encountered in the plugging of a clutch, such apparatus is not sufficienlty rugged to withstand the high mechanical stresses encountered.

In the present invention cooling fins are disposed radially inwardly of the magnetic rim or drum which forms the main part of the induced current member rather than on the ends thereof and the fins are joined to one another in a novel manner providing for mutual support. The fins may thus be firmly anchored to withstand high mechanical stress and end ring connections may, if desired, be dispensed with, without sacrifice of torque output.

Substantial torque in apparatus of the type to which this invention relates has heretofore been dependent upon the provision of induced current paths that each include rotor bars circumferentially spaced over a considerable portion of the pole pitch distance with end ring connections therebetween. A considerable number of such current paths are provided by joining the closely spaced conductor bars to one another in a common end ring circuit that includes the current conducting cooling fins in positions on the sides of the magnetic rim. The cooling fins forming a part of the induced current circuits of the apparatus of this invention are, instead, disposed so as to extend axially through the interior of the magnetic rim to permit rigid attachment with the major structural members supporting such rim. As a consequence high torque output may be obtained as well as the ability to withstand high mechanical stresses arising from high accelerations.

By employment of conductor bars within which torque transmitting induced currents may be carried the drum or rim of the induced current member may be laminated to reduce heating which would otherwise occur therein and such lamination and the flexibility inherent therein has in accordance with this invention been availed of to accommodate thermally induced dimensional changes without undue stress and without substantial alteration in drum diameter.

It is an object of this invention to provide an induced current torque transmitted in which air gap dimension between field and induced current members will remain within narrow limits of variation as heating or cooling of the induced current member occurs, so that a small air gap may be safely employed.

It is another object of this invention to provide an induced current torque transmitter in which evolution of heat in the induced current circuit is caused to occur principally outside the flux conducting magnetic member so that its temperature may be better restricted to minimize air gap variation.

It is another object of this invention to provide an induced current torque transmitter with current conducting cooling fins in the induced current circuit of substantial resistance to cause heat generation in the circuit to take place outside the magnetic flux conducting member and in the fins to facilitate rapid dissipation of such heat.

It is another object of this invention to provide an induced current torque transmitter with current conducting cooling fins in the induced current circuit which may be mounted more securely for enhanced mechanical strength to withstand stresses encountered under conditions of high rotational speed and rapid acceleration and deceleration.

It is another object of this invention to provide an induced current coupling with a rotatable induced current member having a relatively small rotational moment of inertia.

It is another object of this invention to provide an induced current torque transmitter with a laminated magnetic rim forming a part of the induced current member formed with a predisposition to yield by transverse bowing of the laminae upon heating, to minimize variation of the air gap dimension with temperature change.

It is another object of this invention to provide an induced current torque transmitter that is compact and of relatively small axial dimension to permit use within restricted space facilities.

These and other objects and advantages of this invention will appear in the description to follow. In the description reference is made to the accompanying drawings, which form a part hereof, and in which there is shown by way of illustration and not of limitation one specific form in which this invention may be embodied.

In the drawings:

Fig. 1 is an end view in elevation with parts broken away of an induced current torque transmitter in the form of a brake in which this invention may be embodied, Fig. 2 is a side view in elevation partially shown in section of the brake shown in Fig. 1, Fig. 3 is a fragmentary end view in elevation of the induced current member of the brake with parts broken away and in section, Fig. 4 is a fragmentary view of the outer circumferential surface of the induced current member of the brake developed in a plane with part of the bars shown broken away, and Fig. 5 is a fragmentary view in section of the induced current member viewed through the plane 5—5 shown in Fig. 3.

Referring now to the drawings, and initially more specifically to Figs. 1 and 2, there is shown therein an induced current torque transmitter 1 in the form of a brake. A stationary outer cylindrical frame 2 of magnetic material is supported by two pairs of feet 3 attached near the bottom, with a horizontal mounting plate 4 extending between the lower ends of the legs 3 of each pair. The legs 3 and plates 4 are securely attached to provide a sturdy mounting capable of transmitting the necessary reaction for the braking action of the apparatus. Secured to each side of the frame 2 is an end bell 5 with a central hub 6 that houses a ball bearing set 7. The ball bearing sets 7—7 rotatably mount a shaft 8 that overhangs the end bells 5 for suitable attachment to apparatus to be controlled by the brake 1.

Secured to the inner circumferential face of the frame 2 are a pair of magnetic pole rings 9 and 10 that are axially spaced from one another to accommodate an annular field winding 11 extending about and disposed against the inner face of the frame 2. The magnetic pole rings 9 and 10 are each formed with a plurality of finger-like poles 12 and 13 respectively that extend radially inwardly and turn axially toward the opposite pole ring to occupy a position adjacent to and radially inside the field winding 11. The poles 12 on the pole ring 9 are staggered with respect to and spaced from the poles 13 on the pole ring 10 so as to be interjacent, to present circumferentially spaced, alternate, north and south magnetic poles upon energization of the winding 11. Mounted on and secured to the central portion of the shaft 8, between the ball bearings 7—7, is a hub 14.

A pair of transverse diaphragm plates 15 encircle the hub 14 with the inner edges thereof securely joined to the outer circumferential face of the hub 14. As clearly shown in Figs. 2 and 5, the plates 15 are closely spaced to form a channel ringing the hub 14 that has its center coincident with the axis of shaft 8 and the axial mid-points of the coil 11 and pole rings 9, 10. A band 16 wrapped about and secured by welding to the outer edges of the plates 15 completes an annular box-like structure, formed by the plates 15 and the band 16, which is slotted axially to receive a plurality of circumferentially spaced axially extending radial spoke plates 17. Each spoke plate 17 is secured at its inner edge to the hub 14 by welding and also to the diaphragm plates 15 and band 16 to form a rigid integral structure of high strength.

Supported on the outer edges of the spokes 17 is a magnetic rim 18 comprising stacked laminations 19. The individual laminations 19 are in the form of annular rings with the major surface areas thereof substantially normal to the axis of rotation such that the stacking is in an axial direction. As is shown in Fig. 4, spaced off-set pins 20 are inserted between the central pair of laminations 19 at intervals causing a slight axial displacement of the lamination stack giving rise to a slight circumferential undulation of the laminations. In forming the magnetic rim 18 the individual laminations 19 may be placed over the spokes 17 and loosely clamped together at points in alignment with the spokes 17. The spacer pins 20 may then be inserted between spokes and the clamps brought up tight. Welds may then be made along the juncture of each spoke 17 with the back face of rim 18 formed by the under margins of the laminations 19 and the clamps removed. Other methods of assembly will occur to those skilled in the art and may be employed if desired.

During the welding operation the rim 18 may be maintained at a temperature substantially higher than that of the spokes 17. If such is done the inner diameter for the laminations 19 is selected to provide a snug fit when placed about the cooler spokes 17 and during the welding operation the weld metal is allowed to flow between the spoke ends and the laminations 19. Upon cooling, the rim 18 will contract inwardly, without a corresponding contraction of the cooler spokes 17 and shrink stresses will be set up in the rim 18. Upon operation of the apparatus as intended, with a substantial temperature rise in the rim 18, the shrink stresses will diminish, since such heating is localized largely in the rim 18 without a corresponding temperature rise in the spokes 17. Thus under running conditions the thermal stresses due to expansion within the rim 18 may be substantially reduced or cancelled through the pre-stressed construction described. Notwithstanding, the effective diameter of rim 18 is little changed by such temperature changes, because of the undulant shape of the laminations 19 caused by the pins 20. Under a temperature rise exceeding that which relieves the shrink stress there will be an axial bowing of the laminations 19 and this would cause the pins 20 to be released. For this reason the pins 20 are used during assembly only and are withdrawn after the laminations 18 have been welded to the spokes 17.

Received within suitable slots 23 in the rim 17 are a plurality of low resistance conductor bars 21, of copper or other good conductor, which bars have a relatively wide and shallow cross section. The bars 21 are embedded so that the outer surfaces thereof are substantially flush with the air gap surface of the rim 18, to reduce leakage reactance. The side surfaces of the bars 21 are spaced slightly from the adjacent surfaces of the drum slots 23 to accommodate thermal expansion and contraction of both the laminations 19 and the bars 21. The bars 21 are, however, firmly held in place by pins or rod splines 22, as shown more clearly in Fig. 3.

The ends 24 of the bars 21 as shown in Figs. 2 and 5 extend first sidewardly from the laminated rim 18 and then turn radially inwardly. A sleeve 25 of a material suitable for welding to steel is closely fitted about and brazed to the bar ends 24 to form a secure mechanical connection having negligible electrical resistance.

Inserted between the spokes 17 under the back face of the rim 18 is a plurality of channel shaped electrically resistive conducting fins 26 each of which extends axially between and joins the ends 24 at opposite sides of the rim 18 of a pair of rotor bars 21. The fins 26 preferably are of weldable metal with an electrical resistance substantially larger than that of their associated rotor bars 21 and they are joined through welded connections to the sleeves 25 on the ends of the associated bar pairs to form closed electrical circuits therewith in which the major resistances of the circuits are located within the fins 26 away from the rim 18, to cause the evolution of heat to occur principally within the fins 26 from which it may be rapidly dissipated. The radially outer margins 27 of the fins 26 are turned to provide stiffness and to present attachment areas which abut the radially inwardly turned ends 24 of the associated rotor bars 21. As clearly shown in Fig. 3 the turned margins 27 of a fin 26 are directed toward one another with the edges closely spaced.

Spacers 28, as shown in Fig. 5, are disposed with the radially inner edges between the facing margins 27 of the fins so as to extend outwardly between the sleeves 25 of the associated bars 21. Weld metal is then caused to enter between the sleeves 25 and the edges 27, about the side, top and bottom edges of each spacer 28 to form connections between the bars 21 and the fins 26 of good mechanical strength and low electrical resistance. In this way the rotor bars 21 are joined into pairs with the ends of the pairs short circuited to one another and also connected through the fins 26. There are thus provided low resistance current paths comprising adjacent bars of the bar pairs in addition to the high resistance circuits which are completed through the fins 26. The purpose served by the dual short circuit connections between bar ends is that of sustaining high torque in both high and low slip ranges in the manner more fully described in co-pending application of K. L. Hansen, Serial No. 392,397. If desired the dual connection may be dispensed with by connecting the fin margins 27 individually to the sleeves 25, and eliminating the spacers 28.

The radially inner ends of the fins 26 are comprised of margins 29 that are turned inwardly in the same fashion as the outer margins 27 to further stiffen the fins and to present attachment surfaces. The facing edges of the turned margins 29 are secured to one another by welding to complete the inner structure of the channel fin construction, thus adding to its strength. The margins 29 as shown abut the band 16 and are secured thereto by welding to anchor the inner fin margins 29 firmly in place. For additional strength short bracing cylinders 30 may be disposed between and attached to the fins 26, as is shown in Figs. 1, 2 and 3.

In an induced current torque transmitter suitable for use as a brake or a clutch it is desirable to maintain high levels for torque output over a wide range of slip-speed. To maintain such torque output at the larger slip-speeds it is essential to have substantial resistance in the induced current circuit. In the present invention the fins 26 are formed of material presenting such desired resistance and heat generation will occur principally in the fins rather than the embedded bars 21. Cooling air passing over the large convection surfaces of the fins 26 will extract heat at a rapid rate at moderate temperatures in the fins and even lower temperature in the drum 18, thus minimizing variations of magnetic permeability and thermal expansion and stresses that would arise on account thereof.

The fins 26 being located to extend through the induced current member along the back face of rim 18, in closely spaced relation with the spokes 17, the band 16 and one another are readily braced for high strength. Connections for anchoring the fins may be made not only with the rotor bars, but also at the mid points thereof adding to the mechanical strength of the apparatus. The mid points of the fins 26 where attachment is made become points of common potential between the several independent closed circuits which loop the rim 18, with the result that there is no current flow of substantial magnitude from fin to fin, and the effective resistance of the fins is not affected by the mid point attachment.

Thermal expansion in a radial direction of a magnetic rim of an induced current member may be minimized to some extent by dividing the rim into shoes by means of axially extending slots cut through the rim. In the present invention the magnetic laminations 19 of the induced current member are not so divided but are free to bow axially between the anchorages with the spokes 17. This freedom to increase dimension axially minimizes greatly radial dimensional changes under conditions where spoke and hub temperatures are held low, thus holding a nearly uniform air gap over a wide temperature range. The elimination of expansion slots provides a continuous magnetic path which markedly reduces magnetic vibration and noise.

We claim:

1. In an induced current torque transmitting apparatus the combination of a field member having circumferentially spaced magnetic poles, an induced current member relatively rotatable with respect to said field member having a rim of magnetic material with an air gap surface closely spaced from said poles and a back face oppositely disposed with respect to the air gap surface, a plurality of rotor bars of relatively low electrical resistance supported by said induced current member to traverse flux extending from said magnetic poles through said rim upon relative rotation of said field and induced current members to induce currents therein, and a plurality of conducting fins each of relatively high electrical resistance with respect to that of a rotor bar that are connected between the ends of the rotor bars and extending along the back face of said rim.

2. In an induced current torque transmitting apparatus the combination of a field member having circumferentially spaced magnetic poles, an induced current member relatively rotatable with respect to said field member having a rim of magnetic material with an air gap surface closely spaced from said poles and a back face opposite the air gap surface, a plurality of rotor bars of relatively low electrical resistance embedded in said magnetic rim disposed close to said air gap surface and remote from said back face to traverse flux extending from said poles through said rim upon a relative rotation of said field and induced current members and having end portions at the sides of said rim, and a relatively high resistance fin for each rotor bar joining the ends thereof and extending along the back face of said rim to form with the respective rotor bar a current conducting loop encircling a portion of said magnetic rim.

3. In an induced current torque transmitting apparatus the combination of a field member having spaced circumferential magnetic poles, an induced current member relatively rotatable with respect to said field member having a rim of magnetic material with an air gap surface closely spaced from said poles and a back face opposite the air gap surface, a plurality of rotor bars of relatively low electrical resistance supported by said induced current member to traverse flux extending from said magnetic poles through said rim upon relative rotation of said field and induced current members to induce currents therein, and a plurality of conducting fins of relatively high electrical resistance with respect to said rotor bars extending across the back face of said rim electrically connected between the rotor bar ends on opposite sides of said rim.

4. In an induced current torque transmitting apparatus the combination of a field member having circumferentially spaced magnetic poles, an induced current member relatively rotatable with respect to said field member having a flux conducting rim closely spaced from said magnetic poles to conduct flux extending from the poles, a plurality of rotor bars mounted on said rim in position to sweep flux extending from said magnetic poles through said rim upon relative rotation of said field and induced current members to induce currents therein, and a plurality of conducting fins radially to the side of said rim opposite that spaced from said poles with air passages to the sides thereof and each being of narrower cross section and of greater surface area than that of a rotor bar, said fins being joined between the ends of said bars to form current paths therewith encircling said rim and linked with flux passing through said rim.

5. In an induced current torque transmitting apparatus the combination of a field member having circumferentially spaced poles with energizing windings for producing a magnetic flux field, an induced current member relatively rotatable with respect to said field member having a rim of magnetic material closely spaced from the poles of said field member to form a gap therebetween, a plurality of rotor bars adjacent said gap embedded in said magnetic rim extending transversely to the direction of relative motion between field and induced current members for the generation of currents therein terminating in end portions at the sides of the rim, and a plurality of conducting fins of resistance substantially greater than that of said rotor bars each connected to and extending between the ends of a rotor bar and passing alongside the face of the rim opposite that face closely spaced to the field member.

6. In an induced current torque transmitting apparatus the combination of a field member having circumferentially spaced magnetic poles, an induced current member relatively rotatable with respect to said field member having a rim of magnetic material closely spaced from said poles formed of stacked laminations secured at circumferentially spaced anchorages, said laminations being bent transversely to the planes of the laminations with convex undulations between anchorages whereby the laminations may bow upon thermally induced dimensional changes, a plurality of rotor bars supported by said induced current member to traverse flux extending from said magnetic poles through said rim upon relative rotation of said field and induced current members, and electrical conductive means forming connections between rotor bar ends to provide closed electrical circuits for the induced currents.

7. In an induced current torque transmitting apparatus the combination of a field member having circumferentially spaced magnetic poles; an induced current member relatively rotatable with respect to said field member having a substantially non-deformable central spider comprising spaced radially extending spokes secured at one end to a hub and having mounting ends extending radially toward said magnetic poles, and a rim of stacked magnetic laminations mounted upon the mounting ends of said spokes with the planes of said laminations being substantially transverse to the axis of rotation of the relatively rotatable field and induced current members said laminations being bent axially whereby each lamination between a pair of mounting ends extends first in one axial direction and then bends to recede from such axial direction so that the laminations may bow upon thermally induced dimensional changes occurring in said rim; a plurality of conductor bars mounted on and extending axially across said laminations; and a plurality of electrically conducting cooling fins disposed between said lamination rim and the hub of said induced current member joined between the ends of rotor bars at opposite sides of said lamination rim.

8. In an induced current torque transmitting apparatus the combination of a field member having circumferentially spaced magnetic poles; an induced current member relatively rotatable with respect to said field member having a substantially non-deformable central spider comprising spaced radially extending spokes secured at one end to a hub and having mounting ends extending radially toward said magnetic poles, a rim of stacked magnetic laminations mounted upon and firmly anchored to the mounting ends of said spokes to hold the laminations in prestressed tension between the spokes; a plurality of conductor bars mounted by said laminations to traverse flux extending from said magnetic poles upon relative rotation of said field and induced current members whereby voltages are induced in said rotor bars to cause current flow that heats said rim to temperatures above that of said spider; and connections between rotor bar ends forming electrical circuit paths for the induced currents.

9. In an induced current torque transmitting apparatus the combination of a field member having circumferentially spaced magnetic poles; an induced current member relatively rotatable with respect to said field member having a substantially non-deformable central spider comprising spaced radially extending spokes secured at one end to a hub and having mounting ends extending radially toward said magnetic poles, a rim of stacked magnetic laminations mounted upon and firmly anchored to the mounting ends of said spokes to hold the laminations in pre-stressed tension between the spokes, the planes of said laminations being substantially transverse to the axis of rotation of the relatively rotatable field and induced current members disposed with axial bends that have a deflection in one axial direction and then recede from such axial direction to predispose the laminations to axially bow upon the occurrence of thermally induced dimensional changes in said rim; a plurality of conductor bars mounted on and extending axially across said laminations; and a plurality of electrically conducting cooling fins disposed between said lamination rim and the hub of said induced current member joined between the ends of rotor bars at opposite sides of said lamination rim.

10. In an induced current torque transmitting apparatus the combination of a field member having circumferentially spaced magnetic poles; an induced current member relatively rotatable with respect to said field member having a substantially non-deformable central spider comprising spaced radially extending spokes secured at one end to a hub and having mounting ends extending radially toward said magnetic poles, and a rim of magnetic material mounted upon the mounting ends of said spokes; a plurality of conductor bars supported by said rim; a plurality of electrically conducting cooling fins of thin cross section and resistance substantially greater than that of said rotor bars disposed between said rim and the hub of said induced current member with major surface areas extending substantially axially and radially, said fins being joined between the ends of rotor bars at opposite sides of said rim; and supporting connections securing said fins to the hub of said induced current member.

References Cited in the file of this patent
UNITED STATES PATENTS

| | | |
|---|---|---|
| 1,286,138 | Starker | Nov. 26, 1918 |
| 1,597,666 | Barr | Aug. 31, 1926 |
| 1,610,506 | Fletcher | Dec. 11, 1926 |
| 1,773,285 | Spencer | Aug. 19, 1930 |
| 2,679,604 | Jaeschko | May 25, 1954 |